United States Patent
Rodal

(10) Patent No.: US 8,086,209 B2
(45) Date of Patent: Dec. 27, 2011

(54) METHOD AND APPARATUS FOR FREQUENCY MIXING OF RADIO FREQUENCY SIGNALS

(75) Inventor: Eric Rodal, Gardnerville, NV (US)

(73) Assignee: Broadcom Corporation, Irvine, CA (US)

( * ) Notice: Subject to any disclaimer, the term of this patent is extended or adjusted under 35 U.S.C. 154(b) by 971 days.

(21) Appl. No.: 11/927,253

(22) Filed: Oct. 29, 2007

(65) Prior Publication Data

US 2009/0111386 A1    Apr. 30, 2009

(51) Int. Cl.
*H04B 1/26* (2006.01)
*H04B 1/18* (2006.01)

(52) U.S. Cl. .............. 455/326; 455/189.1; 455/190.1

(58) Field of Classification Search .......... 455/209, 455/293, 326, 189.1, 190.1, 255, 313, 316, 455/323; 375/354, 355, 363
See application file for complete search history.

(56) References Cited

U.S. PATENT DOCUMENTS

| | | | | |
|---|---|---|---|---|
| 6,674,998 | B2* | 1/2004 | Prentice | 455/114.2 |
| 7,099,297 | B2* | 8/2006 | Hughes et al. | 370/338 |
| 7,221,723 | B2* | 5/2007 | Walker | 375/355 |
| 7,409,012 | B2* | 8/2008 | Martin et al. | 375/308 |
| 7,593,496 | B2* | 9/2009 | Fan et al. | 375/355 |
| 2008/0084922 | A1* | 4/2008 | Kleveland et al. | 375/211 |

* cited by examiner

*Primary Examiner* — Sonny Trinh

(74) *Attorney, Agent, or Firm* — McAndrews, Held & Malloy, Ltd.

(57) ABSTRACT

A mixer such as an I/Q mixer, having an amplifier having first and second inputs and an output. The first input corresponding to, for example, an I input, and the second input corresponding to, for example, a Q input. The mixer also including a multiple way (M-way) switch having a single input in communication with the output of the amplifier; a frequency control input; and at least four outputs. The frequency control input is configured to receive a periodic signal, and the M-way switch is configured to switch a signal received on the single input to each of the at least four outputs at a switching frequency that is determined by the periodic signal. The M-way switch is operable to switch the input signal received on the single input to each of the at least four outputs in a serial fashion.

17 Claims, 3 Drawing Sheets

METHOD AND APPARATUS FOR FREQUENCY MIXING OF RADIO FREQUENCY SIGNALS

BACKGROUND OF THE INVENTION

1. Field of the Invention

The present invention relates to radio-frequency telecommunications and, more particularly, to a method and apparatus for frequency mixing of in-phase and quadrature components of wireless signals, such as satellite or cellular signals.

2. Description of the Related Art

Increasing market penetration of wireless-communication or, simply, "wireless" devices, such as cellular telephones, radios, global-navigation-satellite-system (GNSS) receivers and the like, is generally premised on reducing costs associated with deployment of such devices while maintaining or improving performance and/or adding features thereto. One way to accomplish this task is to continually improve upon the components that perform electronic functions for wireless communications. For example, through continuous improvement of such components, newer generations of such wireless devices are routinely deployed in smaller packages with more processing power and lower power consumption, yet cost less than their earlier counterparts.

One component of the wireless devices, which are vast in amount and varied in functionality, is a mixer. The mixer is typically implemented in one of two configurations. The first configuration is an up-conversion configuration, and the second configuration is a down-conversion configuration.

In the up-conversion configuration, the mixer "up converts" an input signal to a radio-frequency (RF) signal so as to include the information carried by the input signal. The up-converted RF signal may then be used to transmit such information over a wireless transmission medium. In the down-conversion configuration, the mixer "down converts" a transmitted RF signal to a baseband, near baseband or intermediate-frequency (IF) signal. The down-conversion of the RF signal allows for extraction of the information carried in such RF signal.

Often, there are other ways to build down converters without using IQ mixing. two (2) conventional mixers are needed to down convert an RF signal. Collectively, these conventional mixers are commonly referred to as "IQ mixers;" one for obtaining from the RF signal an in-phase signal (i.e., a "conventional I mixer"), and the other for obtaining from the RF signal a quadrature signal (i.e., a "conventional Q mixer"). The I mixer uses an output signal from a local oscillator (LO signal) to obtain the in-phase signal. The Q mixer uses the (or another) LO signal to obtain the quadrature signal. Typically, the in-phase LO signal is shifted 90° with respect to the quadrature phase LO signal.

The RF signal is split and applied to both the I and Q mixers, i.e., each mixer receives half the RF signal current. To obtain the in-phase and quadrature signals, the I and Q mixers mix the RF signal and the LO signal at each one-quarter interval of each cycle of the LO signal. The I mixer sequentially switches the RF signal to its output so that the output over the four one-quarter intervals (i.e., one cycle) of the LO signal follows a +I, +I, −I, −I sequence. Similarly, the Q mixer may sequentially switch the RF signal to its output so that the output over the four one-quarter intervals (i.e., one cycle) of the LO signal follows a +Q, −Q, −Q, +Q sequence.

The conventional IQ mixers or more particularly, the components thereof, are always active, even though only one (e.g., the I or the Q) of the conventional IQ mixers is operating at any given time. Thus, each of the conventional IQ mixers consumes power.

Moreover, noise on the output of each of the conventional IQ mixers is proportional to an amount of time that the RF signal is switched to the output. Thus, the noise on the output of each of the conventional IQ mixers is present over the entire cycle of the LO signal, and for a ring-type I/Q mixer, exhibits a signal-to-noise ratio of roughly about −3.9 decibels (dB).

In view of these challenges, there is a need in the art for method and apparatus for frequency mixing that provides improved noise and power consumption.

SUMMARY OF THE INVENTION

A method and mixer for mixing radio-frequency (RF) signal and an M-ary pulsed LO signal. The method including (a) providing, responsive to the local oscillator (LO) signal being active for a portion of each one-half cycle of a first phase of the RF signal, a first output signal that is proportional to (i) the first phase (e.g., an in-phase component) of the RF signal over the portion of the first one-half cycle of the first phase, and (ii) a complement of the first phase of the RF signal over the portion of the second one-half cycle of the first phase; and (b) providing, responsive to the control signal being active for a portion of each one-half cycle of a second phase (e.g., an quadrature-phase component) of the RF signal, a second output signal that is proportional to (i) the second phase of the RF signal over the portion of the first one-half cycle of the second phase, and (ii) a complement of the second phase of the radio-frequency signal over the portion of the second one-half cycle of the second phase.

Embodiments of the invention may further provide an active mixer. The active mixer generally includes an multiplexer having at least one input for receiving an RF signal, and at least two outputs for generating two different phases of the amplified RF signal. The multilplexer is controlled via a control signal such as a quadrature pulsed LO signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements, and wherein.

DETAILED DESCRIPTION

Described herein below are embodiments and other examples of a method and apparatus for frequency mixing of a radio-frequency (RF) signal, such as a satellite or cellular signal, to obtain two or more signals having phases in synchronism with respective phases of the RF signal (e.g., in-phase and quadrature components of the RF signal). These embodiments and other examples may be particularly useful for deployment in a receiver that is usable in a Global-Navigation-Satellite System (GNSS).

Those skilled in the art will appreciate that the method and apparatus may be used with various other types of mobile or wireless systems and devices. In addition, these wireless devices may be "location-enabled," and may be embodied as cellular telephones, pagers, laptop computers, personal digital assistants (PDAs), and like type wireless devices known in the art. Generally, location enabling the mobile devices may be facilitated by including within the devices a capability of processing satellite signals of the GNSS ("GNSS satellite signals").

In addition, the details of the method and apparatus provided herein allow one skilled in the art to recognize that, as compared to conventional methods and apparatuses, one or more embodiments and other examples of the apparatus and/or devices that implement the method provide improved gain without having to increase power for consumption or current input to the apparatus or devices; and provide increased signal-to-noise ratios (SNRs) of signals output from the apparatus and/or the devices.

Figure 1:
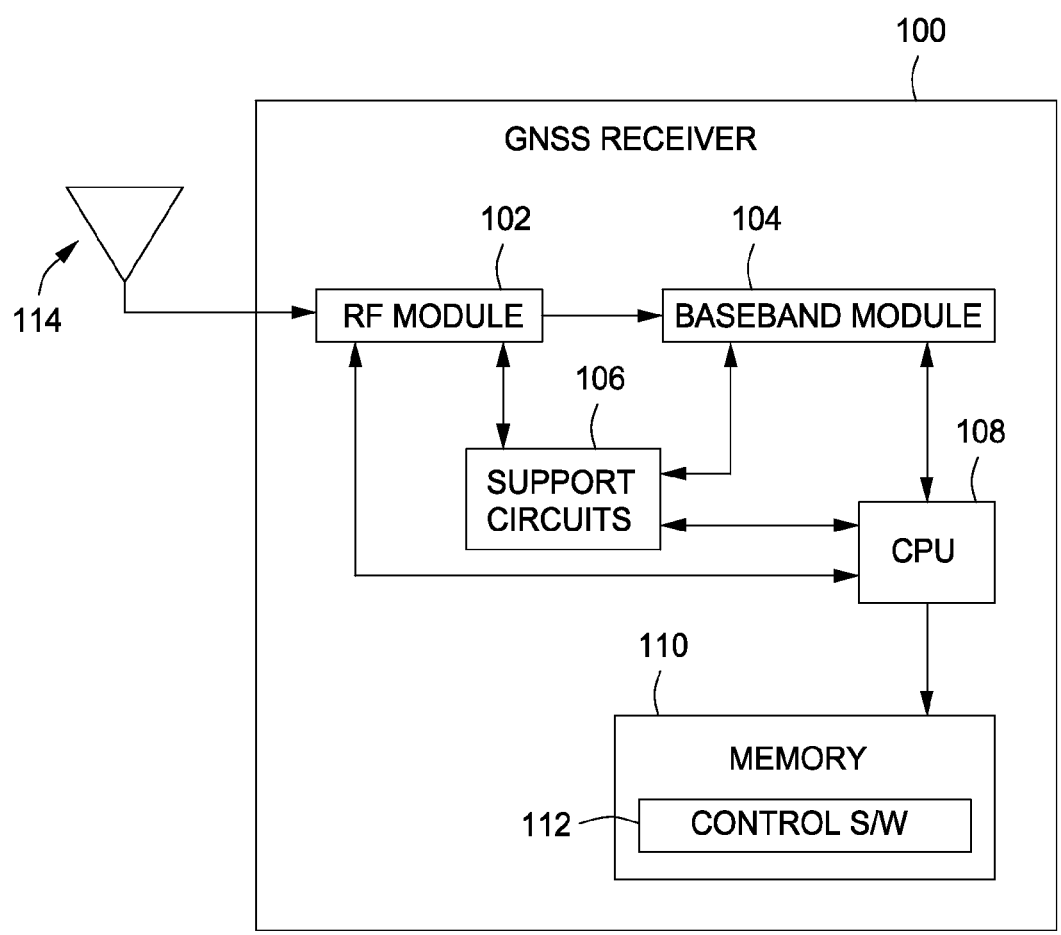
FIG. 1 is a block diagram illustrating an example of a Global Navigation Satellite System (GNSS) receiver.

FIG. 1 is a block diagram illustrating an example of a GNSS receiver 100. The GNSS receiver 100 includes a radio frequency (RF) module 102, a baseband module 104, support circuits 106, central processing unit (CPU) 108 and memory 110. The GNSS receiver 100 is typically coupled to an RF antenna 114 that is tuned to receive signals from at least one GNSS satellite. The RF module 102 processes the received RF signals to produce a baseband signal. The baseband signal is coupled to the baseband module 104 where the signals are further processed to extract information used to compute the position of the receiver 100.

The RF module 102 and the baseband module 104 are supported by support circuits 106 including oscillators, power supplies, clock circuits and the like. The CPU 108 performs control and computation functions by executing control software 112 that is stored in memory 110.

The GNSS receiver 100 may be implemented as a stand alone receiver or as a component within a system or device. In one embodiment, the GNSS receiver 100 may be a component within a cellular telephone. In such an embodiment, the CPU 108, memory 110 and some support circuits 106 may be part of the cellular telephone. This configuration is known as a host-based configuration. Although the GNSS receiver 100 is described herein as one form of receiver that may benefit from the present invention, those skilled in the art will realize that other forms of receivers may likewise benefit from the present invention.

Figure 2:
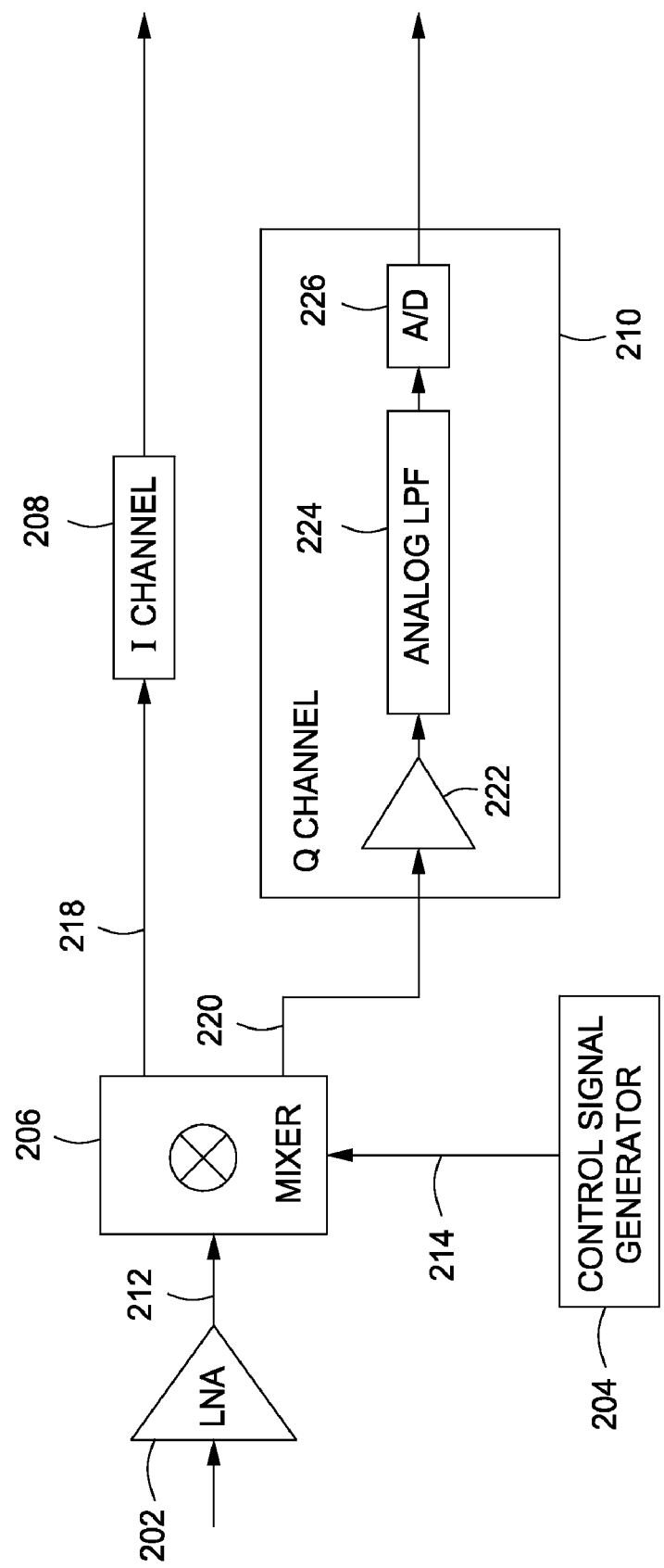
FIG. 2 is a block diagram illustrating an example of a radio-frequency (RF) module of a GNSS receiver, such as the GNSS receiver of FIG. 1.

FIG. 2 is a block diagram illustrating an example of the RF module, such as the RF module of 102 of the GNSS receiver 100. The RF module 102 may include a low-noise amplifier (LNA) 202 and a control-signal generator 204, which are communicatively coupled to a mixer 206, which in turn, is communicatively coupled to first and second processing channels 208, 210.

The LNA 202 includes an input and an output, and functions to amplify and filter the RF signal so as to minimize noise generated during formation of an amplified RF signal. The input is adapted to receive an RF signal from the antenna 114 of FIG. 1. The output of the LNA 202 provides the amplified RF signal to the mixer 206.

The control-signal generator 204 includes circuitry that generates the control signal, and an output for providing the control signal to the mixer 206. This circuitry may comprise a local oscillator (LO), a phase-lock loop or other closed-loop feedback control system, a clock signal or any other device capable of providing the control signal. In addition, the circuitry may generate the control signal so that it is active during two or more time periods of a cycle of each of first and second phases (e.g., an in-phase component or "I-phase" and a quadrature-phase component or "Q-phase") of the amplified RF signal. In one embodiment, the control signal is a quadrature-pulsed-local-oscillator signal.

For example, the circuitry may generate the control signal so that it is active for first, second, third and fourth time periods; each of which has a corresponding duration. The first time period may have a duration that corresponds to a portion, but not all, of a first one-half cycle of the first phase of the amplified RF signal. The second time period may have a duration that corresponds to a portion, but not all, of a second one-half cycle of the first phase of the amplified RF signal. The third time period may have a duration that corresponds to a portion, but not all, of a first one-half cycle of the second phase of the amplified RF signal. The fourth time period may have a duration that corresponds to a portion, but not all, of a second one-half cycle of the second phase of the amplified RF signal.

In one embodiment, each of the first and second time periods has a duration that is approximately equal to one-half of their respective one-half cycles of the first phase of the amplified RF signal. When the first and second time periods have such durations, the control-signal generator 106 may activate the control signal at approximately ninety degrees from initiation of each of the first and second one-half cycles of the first phase of the amplified RF signal.

Similarly, each of the third and fourth time periods may have a duration that is approximately one-half of their respective one-half cycles of the second phase of the amplified RF signal. When the third and fourth time periods have such durations, the control-signal generator 106 may activate the control signal at approximately ninety degrees from initiation of each of the first and second one-half cycles of the second phase of the amplified RF signal. In other embodiments, the control signal is an M-phase signal having any number (M) of phases. For example, a three phase signal could be used to produce I, Q, Z output signals.

In general, the mixer 206 receives (i) the amplified RF signal from the LNA 202 and (ii) the control signal from the control-signal generator 206. Responsive to the amplified RF and control signals, the mixer 206 is adapted to output to the first and second processing channels 208, 210. To facilitate the mixing process, the mixer 206 includes an RF input 212, a control-signal input 214, and two outputs, namely, the first and second outputs 218, 220. In other embodiments where an M-phase control signal is used, the mixer 206 includes M outputs.

Each of the first and second output signals (outputs 218, 220) has a respective waveform, which is formed as a function of the amplified RF signal. The waveform of the first output signal is in phase or substantially in synchronism with a first phase (e.g., an in-phase component or I-phase) of the amplified RF signal. The waveform of the second output signal is in phase in or substantially in synchronism with the second phase (e.g., a quadrature-phase component or Q-phase) of the amplified RF signal.

As described in more detail below, the mixer 206 may form the first and second output signals by multiplexing the amplified RF and control signals when the control signal is active, as noted above. For example, the mixer 206 may form the first output signal so that it has a waveform that is proportional to (i) the I-phase during the first time period, and (ii) a complement of the I-phase during the third time period. This way, the first output 218 of the mixer 206 may provide to the first processing channel 208 the first output signal having a waveform in or substantially synchronism with the I-phase of the amplified RF signal.

The mixer 206 may form the second output signal so that it has a waveform that is proportional to (i) the Q-phase during the second time period, and (ii) a complement of the Q-phase during the fourth time period. Accordingly, the second output 220 of the mixer 206 may provide to the second processing channel 210 the second output signal having a waveform in or substantially synchronism with the Q-phase of the amplified RF signal.

Because the mixer 206 is operable to provide multiple signals having phases in synchronism with the phases of the amplified RF signal, it advantageously obviates the need for multiple mixers to perform the same function. In turn, the RF module 102 provides a substantial savings in power consumption over conventional RF front ends that use multiple mixers to achieve a similar result. These savings result from not having to power multiple mixers to perform the same function.

In addition, all of the current of the amplified RF signal can be supplied to the mixer 206, not one-half as used by conventional RF front ends that use multiple mixers, thereby avoiding challenges to conventional mixer operation caused by insufficient current in the amplified RF signal. Providing full current to the mixer 206, in turn, allows the RF module 102 to provide the first and second output signals that exhibit cleaner, higher gain and less noise characteristics as compared to signals output from conventional RF front ends that use multiple mixers.

Referring again to FIG. 2, each of the first and second processing channels 208, 210 are configured to respectively process the first and second output signals into respective first and second baseband signals. To perform this function, both processing channel 208, 210 include an amplifier 222, a low pass filter 224 and an analog-to-digital (A/D) converter 226. For brevity's sake, only the second processing channel 210 is described herein.

The amplifier 222 is adapted to receive and amplify the first output signal and provide it to the low-pass filter 224. The low-pass filter 224 may be, for example, an analog low-pass filter. The low-pass 224 is adapted to filter the first output signal in preparation of passing it to the A/D converter 226. The analog-to-digital converter can range in accuracy from one bit to three or more bits. More bits increases the SNR and thus the performance of the GNSS receiver 100. Most convention GPS receivers today use two or three bits. The A/D converter 226 functions to convert the first output signal into a digital waveform representative of the first output signal ("first digital signal"). Similarly, the A/D converter (not shown) of the other processing channel functions to convert the second output signal into a digital waveform representative of the second output signal ("second digital signal"). The digitized signals may then be processed by a baseband processor (not shown) in accordance with the requirements of a communications receiver.

Figure 3:
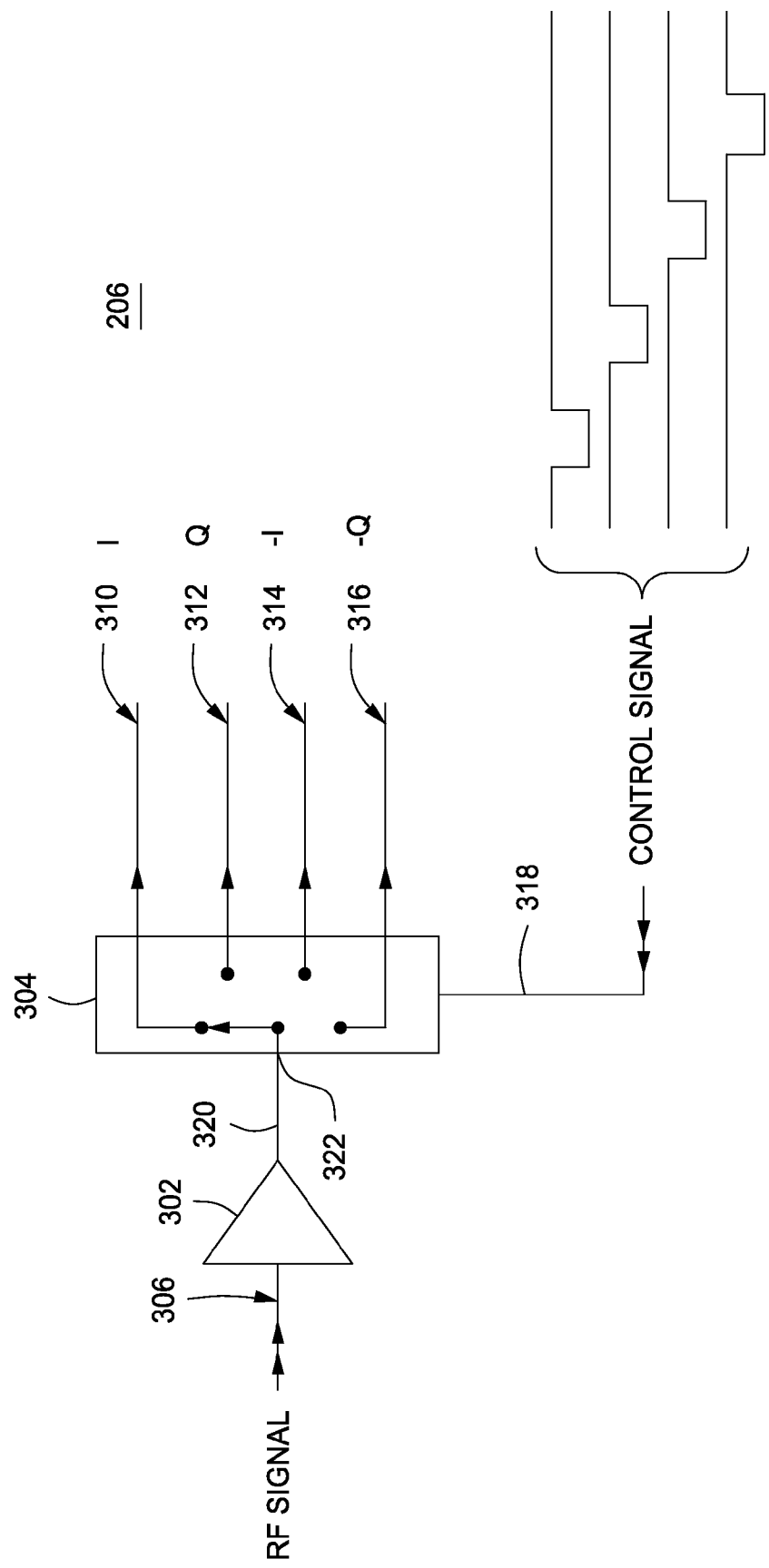
FIG. 3 is a block diagram illustrating an example of an mixer in accordance with the present invention.

FIG. 3 is a block diagram illustrating an example of the mixer 206. For convenience, the mixer 206 is described with reference to the example RF module 102 of FIG. 1. The mixer 206 may be used with other architectures as well.

The mixer 206 includes an amplifier 302, a multiplexer or other switching device 304, an RF input terminal 306, four output terminals 310, 312, 314, 316, and a control-signal input 318. The RF input terminal 306 is in communication with an input of the amplifier 302. The RF input terminal 306 is generally configured to receive the amplified RF signal that is subject to mixing by the mixer 206. Although shown as a single-ended input, the RF input terminal may be configured as a differential input or other type of an input.

An output 320 of the amplifier 302 is generally in electrical communication with an input 322 of the multiplexer 304. The multiplexer 304 is generally configured to multiplex or commutate the amplified RF signal received on the input 322 to the four output terminals 310, 312, 314, 316. To enable such multiplexing, the multiplexer 304 also receives a control signal at the control-signal input 318. This control signal generally operates to control the switching speed of the multiplexer 304. As above, the control signal may be a clock signal or another signal having a known frequency, waveform, etc.

In one embodiment, the output terminals 310, 312, 314, 316 are selected at a LO frequency using a quadrature pulsed LO signal. Using PMOS transistor logic, for example, the control-signal input 318 couples a 4-bit wide signal, and a "low" signal on a control path causes selection of one of the output terminals 310-312. Each of four pulses of the 4-bit wide signal is a 25% duty cycle pulse that has a frequency similar or the same as the frequency of the RF signal received at the input 322. In one embodiment, the LO signal is generated using a VCO signal at a frequency at twice the frequency of the RF signal, and is derived from the VCO by a divide by two circuit that also generates the 25% duty cycle pulses. In other embodiments, the multiplexer 304 may be fabricated for NMOS transistor logic switches or other switch forms, and as such may use other polarity signals.

The multiplexer 304 is adapted to sequentially multiplex the amplified RF signal between the four output terminals 310, 312, 314, 316. The multiplexer 304 may communicate the amplified RF signal received on the input 322 with one of the selected outputs in a serial manner, i.e., the amplified RF signal is brought into communication with the first output 310 for a predetermined period of time (e.g., the duration of the control signal). Then, the amplified RF signal is brought into communication with a second output 312, again for a predetermined period of time. This continues sequentially through the remainder of the outputs 314, 316. Thereafter, the multiplexer 304 returns to communicating the multiplexer 304 to the first output 310 and increments sequentially through the outputs 310, 312, 314, 316.

Through the foregoing repetitive sequence, the multiplexer 304 may be adapted to provide separate output signals on each of the outputs 310, 312, 314, 316. Each of these output signal may be proportional to (or proportional to a complement of) the amplified RF signal over a portion of a one-half cycle of a given phase of the amplified RF signal.

For example, during a first cycle of the outputs, the control signal may be active for: (a) a portion of a first one-half cycle of the first phase (e.g., an I-phase) of the amplified RF signal; (b) a portion of a first one-half cycle of a second phase (e.g., a Q-phase) of the amplified RF signal; (c) a portion of a second one-half cycle of the first phase of the amplified RF signal; and (d) a portion of a second one-half cycle of the second phase of the amplified RF signal. In such case, the signal output to (a) output 310 may be proportional to the amplified RF signal over the portion of a first one-half cycle of the first phase (e.g., a +I-phase component of the amplified RF signal) (b) output 312 may be proportional to the amplified RF signal over the portion of a first one-half cycle of the second phase (e.g., a +Q-phase component of the amplified RF signal); (c) output 314 may be proportional to a complement of the amplified RF signal over the portion of a second one-half cycle of the first phase (e.g., a −I-phase component of the amplified RF signal); and (d) output 316 may be proportional to a complement of the amplified RF signal over the portion of a second one-half cycle of the second phase (e.g., a −Q-phase component of the amplified RF signal). The output signals on the first and third outputs 310, 314 may be combined to provide the first output signal. Likewise, the output signals on the second and fourth outputs 312, 316 may be combined to provide the second output signal.

The multiplexer 304 may sequentially cycle the amplified RF signal at a given cycle rate in accordance with the frequency and duration or "width" of the control signal. When, for example, the frequency of the control signal increases (or decreases), the rate at which the multiplexer 304 multiplexes the amplified RF signal between the four outputs 310, 312, 314, 316 likewise increases (or decreases). In any case, the output signals output to the outputs 310, 312, 314, 316 will change at a factor of four slower than the cycle rate. The frequency of an intermediate-frequency (IF) signal for the I and Q phases is the difference and sum of the RF and LO signal frequencies. When the RF and LO signal frequencies are chosen to be the same, the receiver will have a "zero" frequency IF signal.

In addition, the multiplexer 304 may be operable to activate at a top of each cycle of the control signal received at control-signal input 318. As such, the multiplexer 304 may multiplex the amplified RF signal at optimal times as compared to conventional RF front ends that have multiple mixers in which switching typically moves closer to wave boundaries. By multiplexing near a peak or a high magnitude of the control signal and the RF signal, the output signals output to the four outputs 310, 312, 314, 316 are optimized. Beneficially, the mixer 206 is operable to provide this optimization, which in turn, provides an improved signal to noise ratio as compared to convention mixers. More particularly, the mixer 206 may provide, as compared to conventional mixers, a gain having an improvement from about 2 dB to about 4 dB without any appreciable increase in noise.

The output signal waveform has an energy content that is significantly less than (for example, half or about half) of energy of a conventional mixer. In addition, the mixer 206 has a corresponding output signal to noise ratio increased proportionally to the decrease in energy. For example, the noise in the output signal may be about half of the noise of a conventional mixer.

As an example, a signal-to-noise ratio of a conventional mixer operating with a 10 mA input current was found to be comparable to the signal-to-noise ratio generated by a mixer, such as the mixer 206, operating with a 5 mA input current. Thus, the mixer has been shown to operate with half the input current, while still generating acceptable signal-to-noise ratios. Further, the mixer 206 consumes half the power of a conventional ring mixer.

While the foregoing is directed to embodiments of the present invention, other and further embodiments of the invention may be devised without departing from the basic scope thereof, and the scope thereof is determined by the claims that follow.

What is claimed is:

1. A method for mixing a radio-frequency signal and an M-phase control signal, the method comprising:
   switching an RF signal to one of M outputs of a demultiplexer, where each output is selected in response to an M-phase control signal, wherein the switching step further comprises:
      providing, responsive to the control signal being active for a portion of each one-half cycle of a first phase of the radio-frequency signal, a first output signal that is proportional to (i) the first phase of the radio-frequency signal over the portion of the first one-half cycle of the first phase, and (ii) a complement of the first phase of the radio-frequency signal over the portion of the second one-half cycle of the first phase; and
      providing, responsive to the control signal being active for a portion of each one-half cycle of a second phase of the radio-frequency signal, a second output signal that is proportional to (i) the second phase of the radio-frequency signal over the portion of the first one-half cycle of the second phase, and (ii) a complement of the second phase of the radio-frequency signal over the portion of the second one-half cycle of the second phase.

2. The method of claim 1, further comprising:
   issuing the control signal for the first one-half cycle of the first phase of the radio-frequency signal;
   then issuing the control signal for the first one-half cycle of the second phase of the radio-frequency signal;
   then issuing the control signal for the second one-half cycle of the first phase of the radio-frequency signal; and
   then issuing the control signal for the second one-half cycle of the second phase of the radio-frequency signal.

3. The method of claim 2, wherein each of the portions of the first and second one-half cycles of the first and second phases of the radio-frequency signal has a duration of about one half of its respective first and second one-half cycle and is phase-shifted by about ninety degrees.

4. The method of claim 2, wherein the control signal comprises a local oscillator signal, the method further comprising:
   pulsing the local oscillator signal for a given period for each portion of the first and second one-half cycles of the first and second phases of the radio-frequency signal.

5. The method of claim 1, further comprising:
   combining the first and second output signals to form an in-phase signal having a phase commensurate with an in-phase component of the radio-frequency signal; and
   combining the third and fourth output signals to form an quadrature signal having a phase commensurate with a quadrature component of the radio-frequency signal.

6. A mixer for mixing radio-frequency and control signals, the mixer comprising:
   an first input configured to receive the radio-frequency signal;
   a second input configured to receive the control signal;
   at least one output; and
   a switch configured to:
   provide to the at least one output, responsive to the control signal being active for a portion of each one-half cycle of a first phase of the radio-frequency signal, a first output signal that is proportional to (i) the first phase of the radio-frequency signal over the portion of the first one-half cycle of the first phase, and (ii) a complement of the first phase of the radio-frequency signal over the portion of the second one-half cycle of the first phase; and
   provide to the at least one output, responsive to the control signal being active for a portion of each one-half cycle of a second phase of the radio-frequency signal, a second output signal that is proportional to (i) the second phase of the radio-frequency signal over the portion of the first one-half cycle of the second phase, and (ii) a complement of the second phase of the radio-frequency signal over the portion of the second one-half cycle of the second phase.

7. The mixer of claim 6, wherein the switch is further configured to:

provide, to the at least one output, the first output signal when the control signal is active for the first one-half cycle of the first phase of the radio-frequency signal;

then provide, to the at least one output, the second output signal when the control signal is active for the first one-half cycle of the second phase of the radio-frequency signal;

then provide, to the at least one output, the first output signal when the control signal is active for the second one-half cycle of the first phase of the radio-frequency signal; and then provide, to the at least one output, the second output signal when the control signal is active for the second one-half cycle of the second phase of the radio-frequency signal.

8. The mixer of claim 7, wherein each of the portions of the first and second one-half cycles of the first and second phases of the radio-frequency signal has a duration of about one half of its respective first and second one-half cycle and is phase-shifted by about ninety degrees from initiation of the respective first and second one-half cycle.

9. The mixer of claim 6, wherein the first signal comprises an in-phase signal having a phase commensurate with an in-phase component of the radio-frequency signal; and wherein the second output signal comprises a quadrature signal having a phase commensurate with a quadrature component of the radio-frequency signal.

10. The mixer of claim 6, wherein the control signal comprises a local oscillator signal having a given pulse width for each portion of the one-half cycles of the first and second phases of the radio-frequency signal.

11. The mixer of claim 10, wherein the second input receives the local-oscillator signal in a given timing sequence, and wherein the given timing sequence corresponds to the first one-half cycle of the first phase, the first one-half cycle of the second phase, the second one-half cycle of the first phase, and the second one-half cycle of the second phase.

12. A mixer for mixing radio-frequency and control signals, the mixer comprising:

an first input for receiving the radio-frequency signal;
a second input for receiving the control signal;
at least one output; and
a switch for:
providing to the at least one output, responsive to the control signal being active for a portion of each one-half cycle of a first phase of the radio-frequency signal, a first output signal that is proportional to (i) the first phase of the radio-frequency signal over the portion of the first one-half cycle of the first phase, and (ii) a complement of the first phase of the radio-frequency signal over the portion of the second one-half cycle of the first phase; and providing to the at least one output, responsive to the control signal being active for a portion of each one-half cycle of a second phase of the radio-frequency signal, a second output signal that is proportional to (i) the second phase of the radio-frequency signal over the portion of the first one-half cycle of the second phase, and (ii) a complement of the second phase of the radio-frequency signal over the portion of the second one-half cycle of the second phase.

13. The mixer of claim 12, wherein the switch:

provides, to the at least one output, the first output signal when the control signal is active for the first one-half cycle of the first phase of the radio-frequency signal;

then provides, to the at least one output, the second output signal when the control signal is active for the first one-half cycle of the second phase of the radio-frequency signal;

then provides, to the at least one output, the first output signal when the control signal is active for the second one-half cycle of the first phase of the radio-frequency signal; and then provides, to the at least one output, the second output signal when the control signal is active for the second one-half cycle of the second phase of the radio-frequency signal.

14. The mixer of claim 13, wherein each of the portions of the first and second one-half cycles of the first and second phases of the radio-frequency signal has a duration of about one half of its respective first and second one-half cycle and is phase-shifted by about ninety degrees from initiation of the respective first and second one-half cycle.

15. The mixer of claim 12, wherein the first signal comprises an in-phase signal having a phase commensurate with an in-phase component of the radio-frequency signal; and wherein the second output signal comprises a quadrature signal having a phase commensurate with a quadrature component of the radio-frequency signal.

16. The mixer of claim 12, wherein the control signal comprises a local oscillator signal having a given pulse width for each portion of the one-half cycles of the first and second phases of the radio-frequency signal.

17. The mixer of claim 16, wherein the second input receives the local-oscillator signal in a given timing sequence, and wherein the given timing sequence corresponds to the first one-half cycle of the first phase, the first one-half cycle of the second phase, the second one-half cycle of the first phase, and the second one-half cycle of the second phase.

* * * * *